Nov. 18, 1958 J. A. CHAMBLISS 2,860,477
MULTIPLE BLADE OBLIQUE VEGETATION CUTTER
Filed May 27, 1955

INVENTOR
JOHN A. CHAMBLISS
BY
*Lamont Johnston*
ATTORNEY

United States Patent Office 2,860,477
Patented Nov. 18, 1958

2,860,477

MULTIPLE BLADE OBLIQUE VEGETATION CUTTER

John A. Chambliss, Lookout Mountain, Tenn.

Application May 27, 1955, Serial No. 511,551

3 Claims. (Cl. 56—295)

My invention relates to a device or machine to cut or mow vegetation. I am aware of the mowers that operate by a reciprocating motion, with cutter bar, knives, and guards; of mowers that operate by a blade, which revolves in a plane horizontal with the ground surface, of the mower which revolves with a cutter bar, of the mower which has blades set at right angles to a shaft and cutting extensions on the extremity of the blades.

It is an object of this invention to provide a mowing or cutting machine of simple structure, economical to manufacture and easily and rapidly assembled.

Another object of this invention is to provide a cutting machine which is readily adaptable as either a mower or a saw.

A further object of this invention is to provide a grass or the like cutting structure having rectangular, plane cutter blades mounted parallel to each other loosely on a rotatable shaft at acute angles to the shaft, the planes of revolution of adjacent blades overlapping each other.

Another object of this invention is to provide a grass or the like cutting structure of non-cutter bar type having parallel blades mounted at an angle on a rotatable shaft, the blades being loosely friction held in spaced relation to each other by spacers of a unique structure.

Still another object of this invention is to provide an apparatus for cutting growing vegetation by a scything or chopping action of its blades in alternately inclined sweeps.

Further objects and advantages of the invention will be apparent from the following description taken in conjunction with the drawings, wherein.

Figure 1:
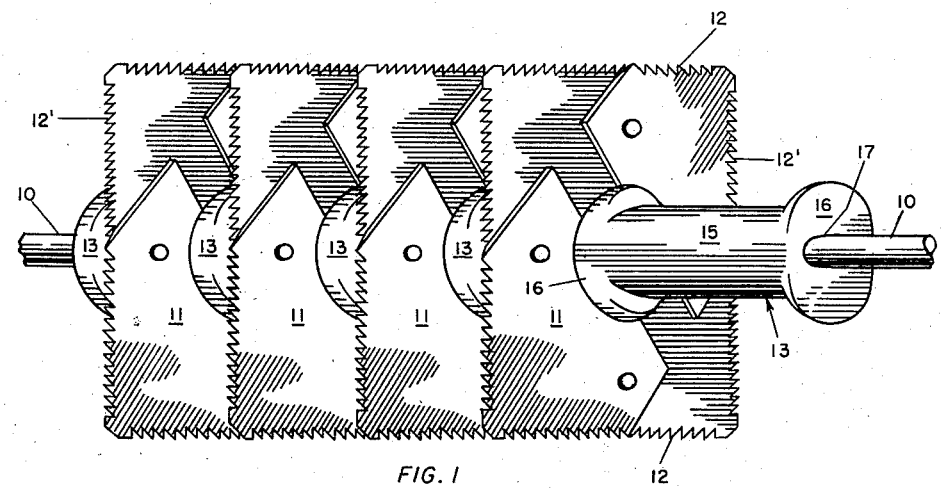
Fig. 1 is a top plan view of the invention.

Referring now to the drawings in more detail, the invention comprises a rotatable shaft 10, which, when disposed in operating position, is approximately parallel to the ground and perpendicular to the direction of translatory motion. The shaft 10 may be mounted for rotation upon any suitable carriage, such as a tractor, truck, or two-wheel trailer. The rotatable shaft 10 may be driven by the power take-off of a tractor or other like vehicle or may be independently rotated by a separate motor. The shaft 10 is preferably rotated in a direction opposite to the rotation of the wheels of the carriage for the mowing machine, in order for the blades 11 to rotate upward on the cutting stroke. It has been found that this upward cutting stroke provides a more effective shearing and cutting action upon the vegetation to be mowed.

Figure 2:
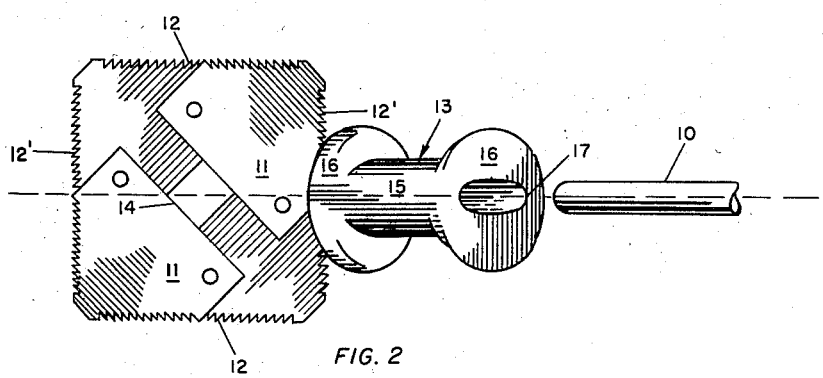
Fig. 2 is an assembly view of elements of the invention taken at an angle of approximately 45° to the view in Fig. 1, so that the plane of the blade and elliptical flanges are parallel to the plane of the drawing sheet.

The blades 11, comprising flat, square or rectangular plates having serrated cutting edges 12 and 12¹, are spaced parallel to each other at an angle to shaft 10. The blades 11 are uniformly spaced from each other and held in fixed overlapping positions with respect to each other by spacers 13. An aperture 14 is formed in the center of each blade 11 to receive the shaft 10. In Fig. 2, the aperture 14 is square to reduce slippage between the blade 11 and the shaft 10.

The spacer 13 comprises a tubular shank 15 having elliptical flanges 16 at each end. The faces of the flanges 16 are parallel to each other and are at acute angles to the axis of the shaft 10, the angles of the flanges governing the angles of the blades 11 with respect to the shaft 10.

The cutting machine made in accordance with this invention is assembled as disclosed in Fig. 2. The shaft 10 is inserted alternately through each aperture 14 of a blade 11 and through a spacer 13, until the shaft 10 is loaded from end to end with alternating blades 11 and spacers 13. The blades 11 are all axially aligned parallel to each other and are normally in the same relative circumferential position, with respect to the shaft, as disclosed in Fig. 1. The spacers 13 are also in axial alignment so that the faces of the elliptical flanges 16 are all parallel to each other and parallel to the planes of the blades 11. It is also desirable that the long axis of the elliptical opening 17 be parallel to the angular diagonal of the square aperture 14, as best disclosed in Fig. 2, to reduce slippage between the blade 11 and shaft 10.

It has been found in actual practice that no adhesive or fastening means is required between the spacers 13 and the blades 11, since friction alone between the elliptical flanges 16 and the blades 11 is sufficient to hold the blades 11 in their same relative position, even at high speeds of rotation. Moreover, in the event that one or more of the blades 11 should strike an obstruction, the omission of any adhesive or fastening means permits a blade to slip between the elliptical spacer flanges 16 on opposite sides of the blade to absorb the shock of the blow.

One of the primary features of this invention is the fact that no cutter bar is used in cooperation with the rapidly rotating blades 11. It has been found that the flat rectangular structure of the blades 11 and their overlapping angular position with respect to the rapidly rotating shaft 10 are sufficient to perform an effective cutting operation upon vegetation of various sizes. Without the use of a cutter bar, the efficiency of the machine is not only improved, but the cost of manufacturing is considerably reduced. Without the use of a cutter bar, clogging of the machine is practically eliminated. This machine is adapted not only to cut grass, weeds, and other vegetation of similar size, but also to perform an effective cutting operation upon cornstalks, saplings and trees of any size. Employment of a cutter bar would limit such a device contemplated by this invention to a mere grass cutter.

The length of the spacers 13, the dimensions of the blades 11, and the angle at which the blades 11 are set with respect to the shaft 10, are such that each cutting edge 12¹, which is perpendicular to the plane passing through the long axis of the elliptical opening 17, overlaps a like edge 12¹ on an adjacent blade 11, so that the cutting swath of each blade overlaps the cutting swath of each adjacent blade.

Figure 3:
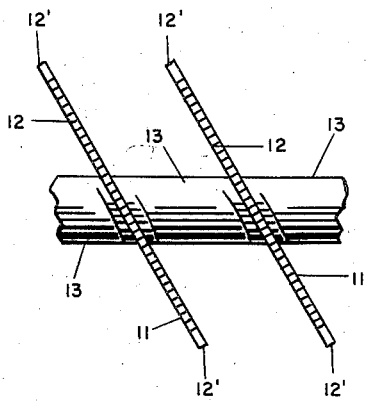
Fig. 3 is a front elevation of a segment of the invention.

During rotation of the shaft 10, the cutting edges 12 perform most of the actual cutting. Fig. 3 discloses a front elevation of the mowing machine with the edges 12 in a position to slice across vertically disposed vegetation. Since the revolutionary paths of the cutting edges 12¹ are substantially vertical, the edges 12¹ will cut only slanting or horizontally disposed vegetation. Although Fig. 1 represents the top plan view of the mowing structure disclosed in Fig. 3, Fig. 1 also represents a front elevation of the structure in Fig. 3 rotated through 90°. When the blades 11 are in the elevation position of Fig. 1, the rotation of the shaft 10 causes the edges $12^1$ of the blades 11 to raise erect and set up any wilted or drooping vegetation for the slicing action of the next cutting edge 12. Thus, rotation of the angular blades 11 creates an alternating setting up and slicing action. The cutting edges 12 on opposite sides of the blades are inclined in opposite directions as they engage the vegetation and they scythe or chop the vegetation in alternately inclined sweeps or swaths. Thus, one edge 12 sweeps upwardly in a path inclined to the left and the opposite edge 12 sweeps upwardly in a path inclined to the right. By this means, since the blades overlap each other, no standing vegetation can escape their scything action, as is true of mowers having all their blades or all their blades in one section inclined in the same direction. The edges $12^1$ effectively cut any vegetation within their reach which is horizontal or on a slant near the horizontal. The alternately inclined edges 12 cut all vegetation which is vertical or inclined either to the right or to the left of the vertical.

By forming the blades in rectangular shapes, the above described cutting of vegetation disposed at any angle is accomplished. The rectangular shape provides clearly defined edges which effect scything or chopping actions comparable to those of a scythe or a sickle.

This apparatus is simple and inexpensive in construction, since the blades are simply formed plane plates and not of expensive, complicated construction. The elimination of a cutter bar and of the need for keeping the cutter bar sharpened and of adjusting the blades accurately relative to a cutter bar provides an inexpensive, yet reliable, apparatus.

Since the blades are mounted loosely on the shaft, they yield when they strike rocks or other dense obstructions and avoid serious damage. Their serrated edges make them very effective in cutting or sawing through vegetation of all kinds.

It will be apparent to those skilled in the art that various changes may be made in the invention, without departing from the spirit and scope thereof and therefore the invention is not limited by that which is shown in the drawings and described in the specification, but only as indicated in the appended claims.

I claim:

1. An apparatus for scything growing vegetation in alternately inclined sweeps comprising a driven shaft, a plurality of rectangular, plane cutter blades mounted loosely thereon and spacers mounted on the shaft between adjacent blades, the spacers having faces abutting the blades at acute angles to the shaft and maintaining the blades parallel to each other at those angles.

2. The invention according to claim 1 in which the blades are square and have a plurality of serrated cutting edges.

3. The invention according to claim 1 in which the swath of each blade overlaps the swaths of the blades adjacent thereto.

References Cited in the file of this patent

UNITED STATES PATENTS

| | | |
|---|---|---|
| 413,364 | Fox | Oct. 22, 1889 |
| 490,782 | Beekman | Jan. 31, 1893 |
| 1,576,862 | Snow | Mar. 16, 1926 |
| 1,623,433 | Newton | Apr. 5, 1927 |
| 2,282,238 | Newton | May 5, 1942 |
| 2,484,071 | Brauer | Oct. 11, 1949 |
| 2,517,390 | Downing | Aug. 1, 1950 |